W. CHURCHILL.
LIGHT SIGNALING SYSTEM.
APPLICATION FILED MAR. 30, 1911.
1,126,705.
Patented Feb. 2, 1915.
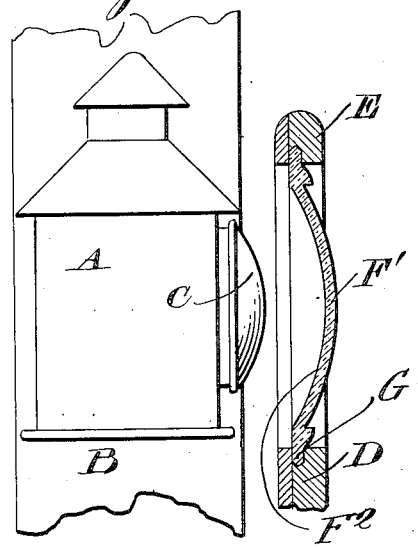
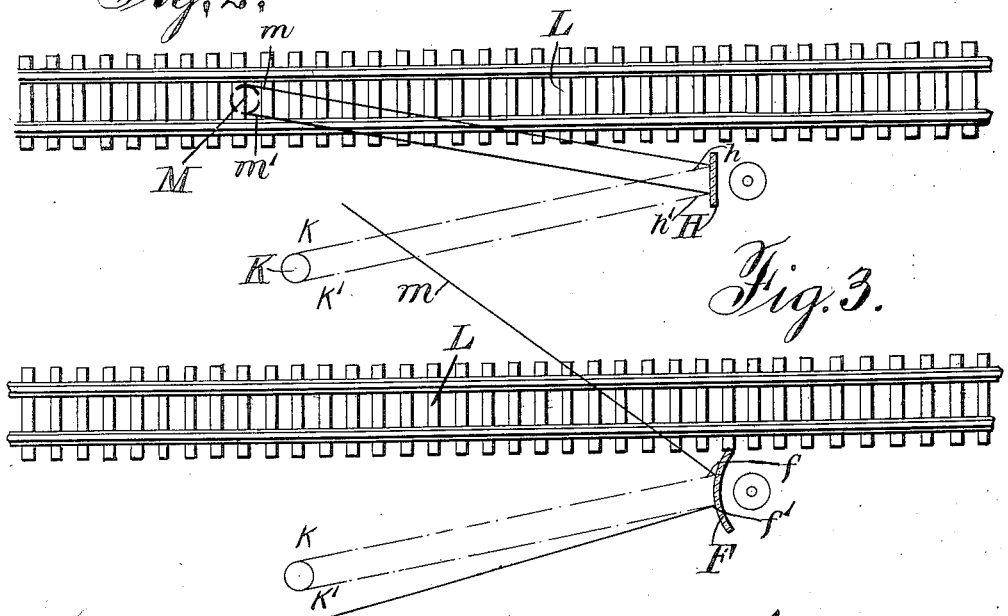

UNITED STATES PATENT OFFICE.

WILLIAM CHURCHILL, OF CORNING, NEW YORK, ASSIGNOR TO CORNING GLASS WORKS, OF NEW YORK, N. Y., A CORPORATION OF NEW YORK.

LIGHT SIGNALING SYSTEM.

1,126,705.  Specification of Letters Patent.  Patented Feb. 2, 1915.

Application filed March 30, 1911. Serial No. 617,953.

*To all whom it may concern:*

Be it known that I, WILLIAM CHURCHILL, a citizen of the United States of America, and a resident of Corning, county of Steuben, State of New York, have invented certain new and useful Improvements in Light Signaling Systems, of which the following is a specification.

As it is well known the apparatus commonly used for signaling and controlling the movements of railway trains generally embodies a source of light, such as a lamp of some kind located along the right of way, a condensing lens for directing the rays in such a direction that they may be seen by an engineer of the train to be signaled, disks of glass, technically known as roundels, mounted in semaphore arms immediately in front of the lens, and means for so moving the arms that any one of the roundels, which are variously colored to correspond with the color signal intended to be displayed, may be interposed in the path of the rays from the lens. It is the existing practice to make the roundels of flat or plane disks, which are clamped in the spectacle frame of the semaphore, but such construction has both structural and optical defects. Structurally it is weak and liable to be broken by slight blows, while optically such a roundel forms, with adjacent sources of light, images, or ghosts. Either of these is incompatible with safety, for a broken roundel may result in giving a "clear" signal with the semaphore set at "danger" position, while a ghost not only gives a color indication due to the fortuitous circumstances of which roundel happens to act as the reflector for the adjacent light sources, but moreover may give a clear indication, due to such reflection when the signal lamp has become extinguished and the signal is thus out of order.

For the purpose of avoiding the defects above noted my invention consists in a signaling apparatus including, in lieu of the common flat roundel before described, one which has convex anterior and a concave posterior or inner face of equal curvature and a surrounding flat flange of annulus by which it may be mounted in the "spectacle frame." By this construction both the mechanical and optical defects above pointed out are avoided, for the convex anterior face of the lens cannot form images of adjacent sources of light, as rays falling thereon are dispersed in all directions and are not received by the eye of the approaching trainmen in sufficient number or intensity to form a visible image, while the curved cross section given to the roundel insures increased strength.

My invention consists in the construction, arrangement and combination of parts of which it is composed as will be hereinafter described and claimed.

Referring to the accompanying drawings in which corresponding parts are designated by corresponding marks of reference:—Figure 1 shows a railway signaling system embodying my invention. Fig. 2 is a diagram illustrating the formation of a "ghost" by the flat roundel now in use. Fig. 3 is a similar view showing the dispersion of light from a roundel constructed in accordance with the preferred form of the invention.

As shown in Fig. 1 my invention comprises a source of light or lantern A, mounted on the post or tower B adjacent to the track the traffic of which is to be controlled, the lantern having a condensing lens C, adapted to project the light along the track so as to render it visible to the engineer at a proper point thereon. The signal post or tower also carries a pivoted semaphore arm D having the usual spectacle frame E as is well known. In the spectacle frame is contained one or more roundels F, the latter being so situated as to be inserted at will by the movement of the arm in front of the beams parallelized by the condensing lens C and being of colored glass to afford the desired signal. The signal which I use has a convex anterior face $F^1$ and a concave posterior or rear face $F^2$ of equal curvature, with a surrounding flat flange G for the purpose of giving greater strength. Strength is also given to the roundel by the curvature of its central parts, tests having shown that the construction results in about four times the resistance to fracture when struck on its anterior face (to which blows it is subjected) as compared with the plane roundel. Entirely independent of the question of strength however, but resulting from the same curvature, the roundel here described is desirable in possessing a valuable optical property, viz., that the front face of the roundel acts to disperse any light falling thereon from its front, and hence the danger does not exist, as with the common flat roundel, of the engineer being deceived by the reflection thereon of an adjacent source of light, such as the head light of the train which is to be signaled or from a light along the right of way. In Fig. 2 I have shown diagrammatically how this occurs with the flat roundel, which is designated H. The rays $kh$, $k'h'$ from a source K adjacent to the right of way L are reflected back over the right of way, as $mh$ and $m'h'$ the reflected rays forming with each other the same angle as the incident rays. Hence the image formed at M by the flat roundel may have considerable brightness. Comparing Fig. 2 with Fig. 3 it will be seen that in the latter, due to the curved anterior face of the roundel the incident rays $kf$ and $k'f'$ are reflected back as $mf$ and $m'f'$, the reflected rays being more divergent than the incident rays and hence any image formed by the curved roundel is much reduced in brightness as compared to that of the plane roundel. In the conditions obtaining in practice it is so dim as not to interfere with proper signaling.

In connection with the roundel previously described I prefer to use the annular beading which is shown, described and claimed in my prior application filed February 3, 1910, Serial No. 541,838, and in Fig. 1 I have such a beading N. This beading is shown surrounding the convex anterior face of the roundel and is at the junction of such face and the flange, and aids materially in strengthening the roundel, while its own anterior face $n'$ may be so shaped as to refract any light passing through the roundel, at a great angle with the principal axis, more or less parallel thereto.

Having thus described my invention, what I claim and desire to secure by Letters Patent is:

1. In a signaling system the combination with a source of light and a condensing lens therefor, of a semaphore arm, and a roundel mounted therein and adapted to be inserted in the path of the beam of light, the roundel having convex anterior and concave posterior faces of equal curvature.

2. In a signaling system the combination with a source of light and a condensing lens therefor, of a semaphore arm, and a signaling roundel contained in the arm, adapted to be inserted in the path of the beam of light, the roundel having convex anterior and concave posterior faces of equal curvature and a surrounding flat flange.

3. In a signaling system the combination with a source of light and a condensing lens therefor, of a semaphore arm, and a signaling roundel contained in the arm adapted to be inserted in the path of the beam of light, the roundel having convex anterior and concave posterior faces of equal curvature and a surrounding flat flange, and an annular beading at the junction of the convex face and the flange.

4. In a signaling system the combination with a source of light and a condensing lens therefor, of a semaphore arm, and a signaling roundel contained in the arm, adapted to be inserted in the path of the beam of light, the roundel having convex anterior and concave posterior faces of equal curvature and a surrounding flat flange, and an annular beading at the junction of the convex face and flange having its own anterior face so shaped as to converge the divergent outer rays falling therein from the condensing lens.

5. The hereinbefore described roundel having a convex anterior and a concave posterior face of equal curvature and surrounding flat flange.

6. The hereinbefore described roundel having a convex anterior and concave posterior face of equal curvature and an annular beading upon the anterior face of the roundel, having its own anterior face so shaped as to form it into a convergent lens.

7. The hereinbefore described roundel having a convex anterior and a concave posterior face of equal curvature and a beading adjacent to the edge of the roundel, having an annular internal face, forming with the face of the roundel a reëntrant angle.

8. The hereinbefore described roundel having a convex anterior and a concave posterior face of equal curvature and having on its anterior face adjacent to the edge thereof a beading whose anterior face is so shaped as to form it into a convergent lens and which has an annular internal face, forming with the face of the roundel a reëntrant angle.

9. The hereinbefore described roundel having convex anterior and concave posterior faces of equal curvature, and having a surrounding flat flange and a beading at the junction of the concave face and the flange.

10. The hereinbefore described roundel having convex anterior and concave posterior faces of equal curvature, and having a surrounding flat flange and a beading at the junction of the concave face and the flange and having its own anterior face so shaped as to form a convergent lens.

11. The hereinbefore described roundel having a beading on its face adjacent to its edge and having a surrounding plane flange, the beading having an annular internal face, forming with the face of the roundel a reentrant angle.

12. The hereinbefore described roundel having on its anterior face adjacent to its edge a beading whose own anterior face is so shaped as to form it into a convergent lens and which has an annular internal face forming with the face of the roundel a reentrant angle, and a surrounding plane flange.

In testimony whereof I have signed my name in presence of two witnesses.

WILLIAM CHURCHILL.

Witnesses:
MARION A. WHITLOCK,
G. WILLIS DRAKE.